(12) United States Patent
Asayag et al.

(10) Patent No.: US 9,379,940 B2
(45) Date of Patent: Jun. 28, 2016

(54) VIRTUAL DEVICE PROFILE TO CONFIGURE VIRTUAL NETWORK INTERFACE CARDS

(71) Applicant: Red Hat Israel, Ltd., Raanana (IL)

(72) Inventors: Mordechay Asayag, Netanya (IL); Michael Kolesnik, Ramat-Gan (IL)

(73) Assignee: Red Hat Israel, Ltd., Raanana (IL)

( * ) Notice: Subject to any disclaimer, the term of this patent is extended or adjusted under 35 U.S.C. 154(b) by 163 days.

(21) Appl. No.: 14/188,882

(22) Filed: Feb. 25, 2014

(65) Prior Publication Data

US 2015/0244568 A1    Aug. 27, 2015

(51) Int. Cl.
*G06F 15/177*    (2006.01)
*H04L 12/24*    (2006.01)
*G06F 9/455*    (2006.01)
*G06F 3/048*    (2013.01)

(52) U.S. Cl.
CPC ............ *H04L 41/0803* (2013.01); *G06F 3/048* (2013.01); *G06F 9/45533* (2013.01); *H04L 41/0879* (2013.01); *H04L 41/0889* (2013.01); *H04L 41/22* (2013.01); *H04L 41/28* (2013.01)

(58) Field of Classification Search
CPC . G06F 9/45533; H04L 41/0803; H04L 41/22; H04L 67/30
USPC ................................................. 709/220, 221
See application file for complete search history.

(56) References Cited

U.S. PATENT DOCUMENTS

| | | | | |
|---|---|---|---|---|
| 7,080,058 B1* | 7/2006 | Upadhyayula | ......... | H04N 1/603 |
| 8,040,356 B2* | 10/2011 | Stokes | ................ | G06F 3/04897 |
| | | | | 345/589 |
| 2005/0114500 A1* | 5/2005 | Monk | ................. | H04L 12/2602 |
| | | | | 709/224 |
| 2010/0235831 A1* | 9/2010 | Dittmer | ............... | G06F 9/45558 |
| | | | | 718/1 |
| 2011/0134793 A1* | 6/2011 | Elsen | ..................... | H04L 12/462 |
| | | | | 370/254 |
| 2014/0068022 A1* | 3/2014 | Kshirsagar | .......... | H04L 41/0806 |
| | | | | 709/220 |
| 2014/0123140 A1* | 5/2014 | Motoki | ............... | G06F 9/45533 |
| | | | | 718/1 |
| 2015/0096011 A1* | 4/2015 | Watt | ....................... | G06F 3/0647 |
| | | | | 726/15 |
| 2015/0134822 A1* | 5/2015 | Bhagwat | ............. | H04L 67/1025 |
| | | | | 709/226 |
| 2015/0156124 A1* | 6/2015 | Tsuji | ....................... | H04L 47/20 |
| | | | | 370/230 |
| 2015/0163196 A1* | 6/2015 | Bhagwat | ............. | H04L 61/2061 |
| | | | | 709/245 |

OTHER PUBLICATIONS

"Understanding Policy-per-vNIC and Smart Groups," Table 14, Chapter 14, Juniper Networks vGW Series Installation and Administration Guide, Revison 2, Mar. 27, 2013, pp. 179-182 http://www.juniper.net/techpubs/en_US/vgw5.0/information-products/topic-collections/vgw-5.0/index.html?topic-62402.html.

\* cited by examiner

*Primary Examiner* — Mohamed Wasel
(74) *Attorney, Agent, or Firm* — Lowenstein Sandler LLP (57) ABSTRACT

A system and a method are disclosed for configuring virtual network interface cards (VNICs) of virtual machines, including presenting on a graphic user interface (GUI), by a management server of a host executing a virtual machine (VM), a plurality of attributes of a virtual network interface card (VNIC), assigning, via the GUI, values to the plurality of attributes, storing the values of the plurality of attributes in a profile on the management server, and configuring a second VNIC of the VM using the values in the profile.

20 Claims, 8 Drawing Sheets

VIRTUAL DEVICE PROFILE TO CONFIGURE VIRTUAL NETWORK INTERFACE CARDS

TECHNICAL FIELD

The present disclosure relates to network computing, and more specifically to methods and systems that configure virtual network interfaces of virtual machines (VMs) running on hosting devices.

BACKGROUND

Virtualization in information processing systems allows for multiple instances of one or more operating systems to run on resources (or components) of one or more hosting computing devices ("host"). Virtualization is typically implemented by using software (e.g., a virtual machine monitor, or a "VMM") to present to each OS a "virtual machine" ("VM") having virtualized hardware resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while "host software" is software, such as a VMM, that runs outside of, and may or may not be aware of, the virtualization environment.

VM(s) may run on one or more hosts. Further, each of the VM(s) may run under the control of a respective OS which may or may not be different from the OS of another VM. Hardware resources of the one or more hosts may also be virtualized. Thus, instead of directly interacting with physical hardware devices (such as processing units, hard drives, network interfaces (NICs) etc.), the operating systems of VM(s) may control virtualized hardware components (such as virtual processing units, virtual disks, and virtual network interface cards etc.). The virtualization of hardware devices may hide the physical characteristics of the one or more hosts from users.

Under current virtualization environments for VM(s), a network administrator needs to define the entire set of network settings for each virtual network interface card (VNIC) of the VM(s). This process is not efficient as it requires the network administrator to perform a significant number of repetitive tasks.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Each virtual network interface card (VNIC) may have a set of network configuration attributes ("attributes"), such as quality of service, port mirroring, and custom properties. A VNIC can be configured by assigning a value ("value") to each attribute of the VNIC. Implementations of the disclosure include systems and methods that facilitate the configuration of virtual network interface cards (VNICs) of virtual machines running on hosts. Instead of manual configuration of each VNIC in VM(s), one or more profiles for VNICs may be created and stored on a management server. A profile may be a file that can be saved on storage device. The content of the profile may be retrieved into memory. Each profile may contain attributes and their corresponding values. Thus, more than one VNIC may be configured using the values in one profile. In this way, the process to configure VNICs of VM(s) may be automated and simplified. Further, certain privileges of the profiles may be granted to users of VMs so that the users may configure aspects of VNICs by editing the profiles.

Techniques to configure VNICs of VM(s) are described herein. In the following description, numerous details are set forth to provide a more thorough explanation of the implementations. It will be apparent, however, to one skilled in the art, that implementations of the present invention may be practiced without these specific details. In other instances, well-known structures and devices are shown in block diagram form, rather than in detail, in order to avoid obscuring implementations of the present invention.

Implementation of the disclosure may include a method. The method may include presenting on a graphic user interface (GUI), by a management server of a host executing a virtual machine (VM), a plurality of attributes of a virtual network interface card (VNIC), assigning, via the GUI, values to the plurality of attributes, storing the values of the plurality of attributes in a profile on the management server, and configuring a second VNIC of the VM using the values in the profile.

Figure 1:
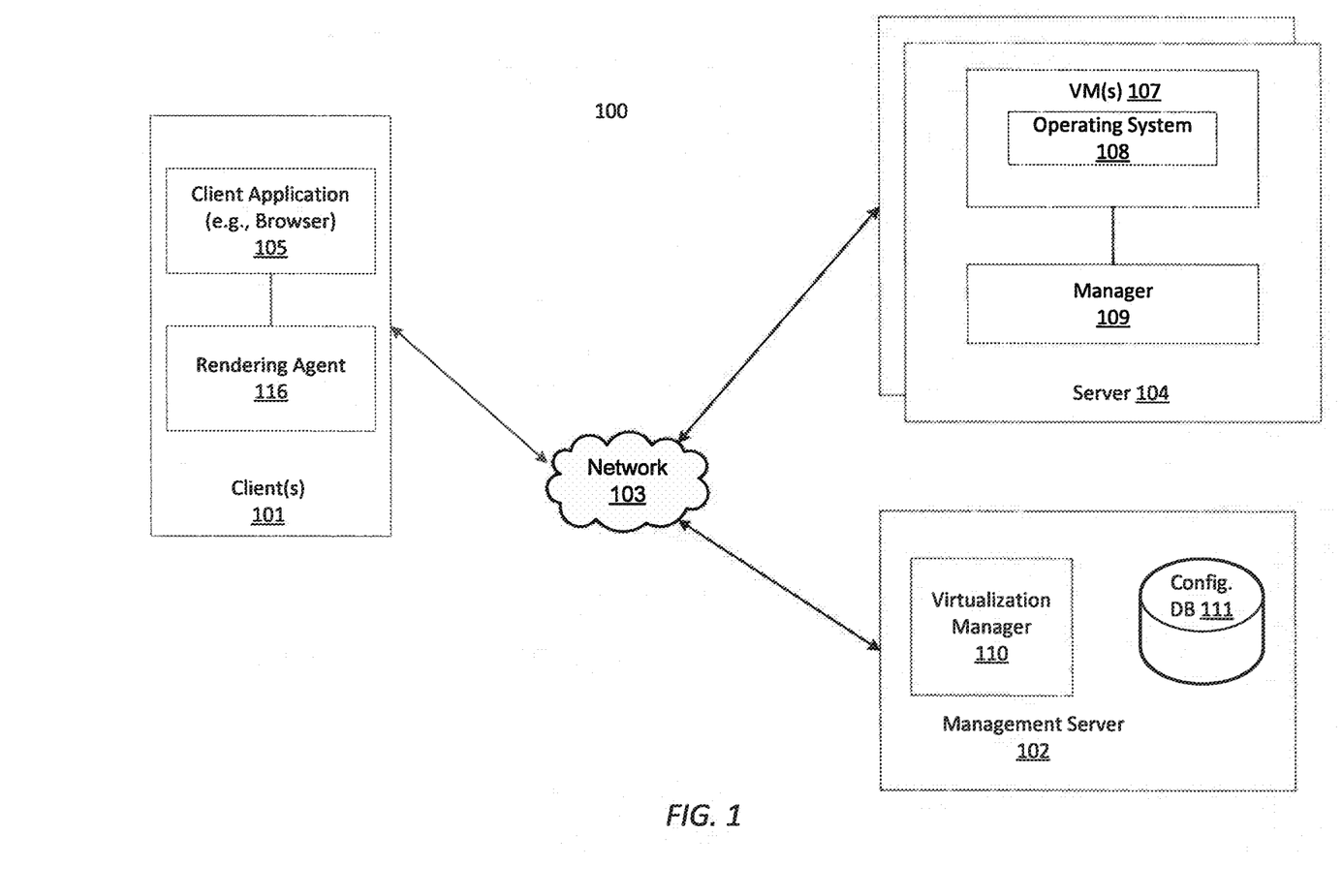
FIG. 1 is a block diagram illustrating a virtualization computing system according to an implementation of the disclosure.

FIG. 1 is a block diagram illustrating a virtualization computing system 100 according to an implementation of the disclosure. Referring to FIG. 1, the system 100 may include, but not be limited to, one or more clients 101 communicatively coupled to a remote server or a cluster of hosts 104 over a network 103. Server 104 may represent an independent machine. Network 103 may be a local area network (LAN) or a wide area network (WAN) and may be a combination of one or more networks. Client 101 can be any computer system in communication with server 104 for remote execution of applications.

Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one implementation, server 104 is to host one or more virtual machines 107, each having one or more desktop applications 108 (e.g., desktop operating system). Operating system 108 may be executed and hosted within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

System 100 may be implemented as part of a server or a cluster of servers within a data center of an enterprise entity. Server 104 may be managed by a management server 102, which may be a separate machine or part of the machine hosting server (e.g., virtual desktop server or VDS). For example, host server 104 may be implemented as a VDS server while management server 102 may be implemented as a VDC (virtual desktop control) server.

In one implementation, server 104 may be a member of a cluster of servers, where each of the member servers of the same cluster is coupled to the same network or the same segment of a network, also referred to as a logical network. In one implementations, server 104 may include multiple network interfaces (not shown), which may be coupled to the same or different logical network. Each network interface of server 104 may be configured via management server 102. Server (hosts) 104 may be configured to be coupled to multiple networks (physical or logical network), such as, a storage network, a virtual local area network (VLAN) for the guests, a management network, and/or a remote display network for remote accesses, etc.

Figure 2A:
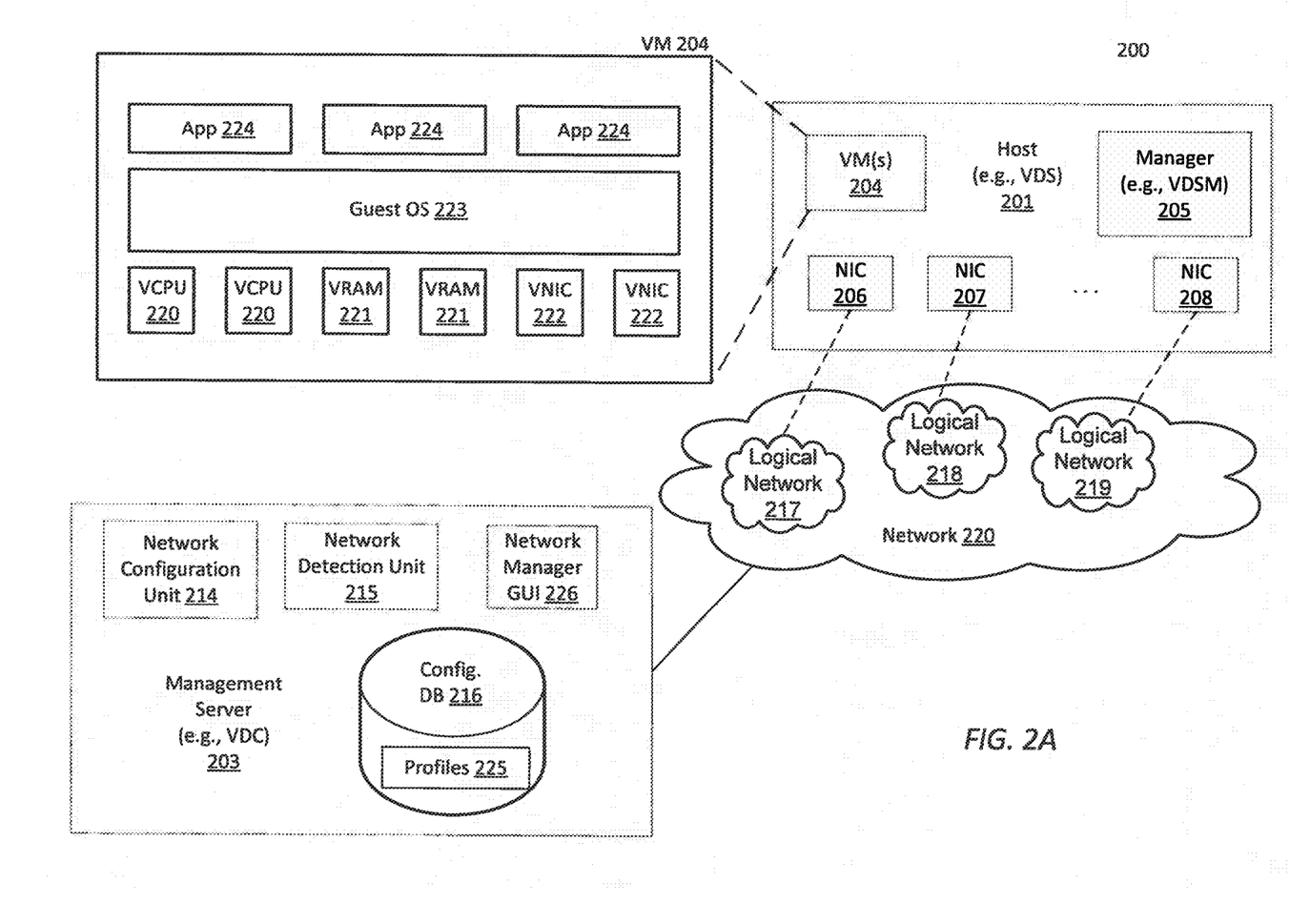
FIG. 2A is a block diagram illustrating a data center according to an implementation of the disclosure.

FIG. 2A is a block diagram illustrating a data center 200 according to an implementation of the disclosure. The data center 200 may include host(s) 201, management server 203, and a network 200. In one implementation, host(s) 201 may be implemented as part of a cluster associated with server 104 (e.g., VDS) and management server 203 may be implemented as part of server 102 (e.g., VDC) of FIG. 1. Referring to FIG. 2A, host(s) 201 and management server 203 are communicatively coupled to each other over network 220. Each of the host(s) 201 may include one or more network interfaces (also referred to as network interface cards or NICs) and host one or more VMs. In this example, host(s) 201 includes NICs 206-208 and hosts one or more VMs 204. Each NIC may be associated with one or more VM hosted by host 201.

In this example, NIC 206 is coupled to logical network 217; NIC 207 is coupled to logical network 218; and NIC 208 is coupled to logical network 219. Each of the logical networks 217-219 is associated with a network identifier (e.g., network name) that identifies the respective network. Note that multiple NICs may be coupled to the same or different logical networks dependent upon a specific network configuration. Similarly, a single NIC may be coupled to multiple logical networks. According to one implementation, after a first host in a network has been detected and configured by an administrator via management server 203, a subsequent host entering the same network can be at least partially automatically configured by server 203 using the network configuration information obtained from an existing host, which may be stored in configuration database 216.

In one implementation, VM(s) 204 may also include a guest operating system 223 that controls the operations of virtual components including virtual central processing units (VCPUs) 220, virtual random access memories (VRAM) 221, and virtual network interface cards (VNICs) 222. VCPUs 220 may be mapped to one or more processing devices in host(s) 201, VRAMs 221 may be mapped to one or more memory devices in host(s) 201, and VNICs 222 may be mapped to one or more NICs 206-208 all by VMM. In one implementation, a VNIC may include a set of configurable attributes, such as QoS. These attributes may be configured with values so that the VNIC may communicate with a logical network as specified by these values. Applications 224 may be executed by VCPUs 220 utilizing virtual resources such as VRAMs 221 and VNICs 222.

Figure 2B:
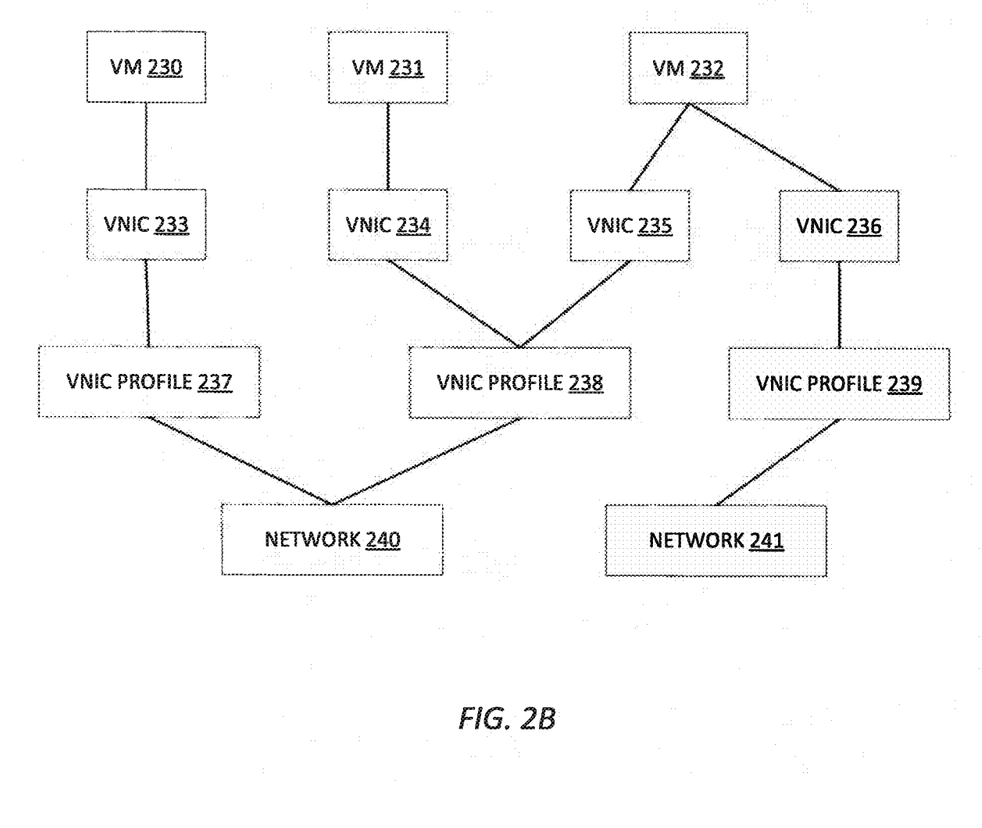
FIG. 2B illustrates an example virtual machine network configurations using profiles according to an implementation of the disclosure.

FIG. 2B illustrates an example virtual machine network configurations using profiles according to an implementation of the disclosure. Referring to FIG. 2B, each of VMs 230-231 may include one or more VNICs 233-236 for network interfaces. However, each VNIC is associated with only one VM. For example, VMs 230, 231 may be associated with VNIC 233, 234, respectively, and VM 232 may be associated with VNICs 235, 236. Profiles may be used to specify the connections from VNICs to logical networks 240-241. For example, the values such as QoS values may specify how the bit rates afforded to a VNIC. A profile may contain a list of network configuration attributes ("attributes") and their corresponding values ("values"). In one implementation, the attributes may include, but not limited to, quality of service (QoS), port mirroring, and custom properties. Values in each profile may be used to specify the attributes of one or more VNICs. For example, profiles 237, 239 may specify the attributes of VNICs 233, 236, respectively, and profile 238 may specify the network configuration attributes of VNICs 234, 235. The profiles may be saved on the management server so that multiple VNICs may share a same profile. Therefore, instead of configuring each attribute of each VNIC, multiple VNICs may be configured using one profile. In this way, the process to configure VNICs may be simplified by using profiles.

Implementations of the disclosure may use one or more profiles to configure one or more VNICs. Each profile may include a list of attributes of VNIC and corresponding values. In one implementation, a profile may include a profile name, identifications of associated networks, Quality of Service values, port mirroring, and custom properties. Thus, a VNIC associated with the profile name may be configured according to the attributes and their values as specified in the profile.

Referring to FIG. 2A, in one implementation, one or more profiles 225 may be specified using a network manager graphic user interface (GUI) 226. Once specified, the profiles 225 may be stored as files in configuration database 216 of management server 203. A profile may be used to configure one or more VNICs 206 of VM(s) 204 running on host(s) 201. For example, a profile 225 may be transmitted by network configuration unit 214 of management server 214 to manager 205 (such as VDSM manager) of host(s) 201. In one implementation, profiles 225 may be specified according an application programming interface (API) such as the VDSM API. The VDSM manager of host 201 may parse the profile 225 and apply the attributes specified in the profile 225 to one or more VNICs. In this way, VNICs may be efficiently configured using one or more profiles 225.

In another implementation, privileges to access some of the one or more profiles 225 may be granted (e.g., at the direction of a network administrator) to a user of the VMs so that the user may select a profile to apply to VNICs. In this way, part of the task to configure VNICs 222 of VMs may be delegated to users, thus further reducing the burden on the network administrator to configure VNICs 222.

In one implementation, one or more profiles 225 may also be stored locally on host(s) 201 so that manager 205 may retrieve a profile more conveniently. For example, manager 205 may store a local copy of each profile that has been used to configure at least one VNIC on host(s) 201. Thus, instead of retrieving these profiles from configuration database 216 via network 220, subsequent configurations of VNICs 222 may be achieved by retrieving the local copies of the profiles.

Figure 3A:
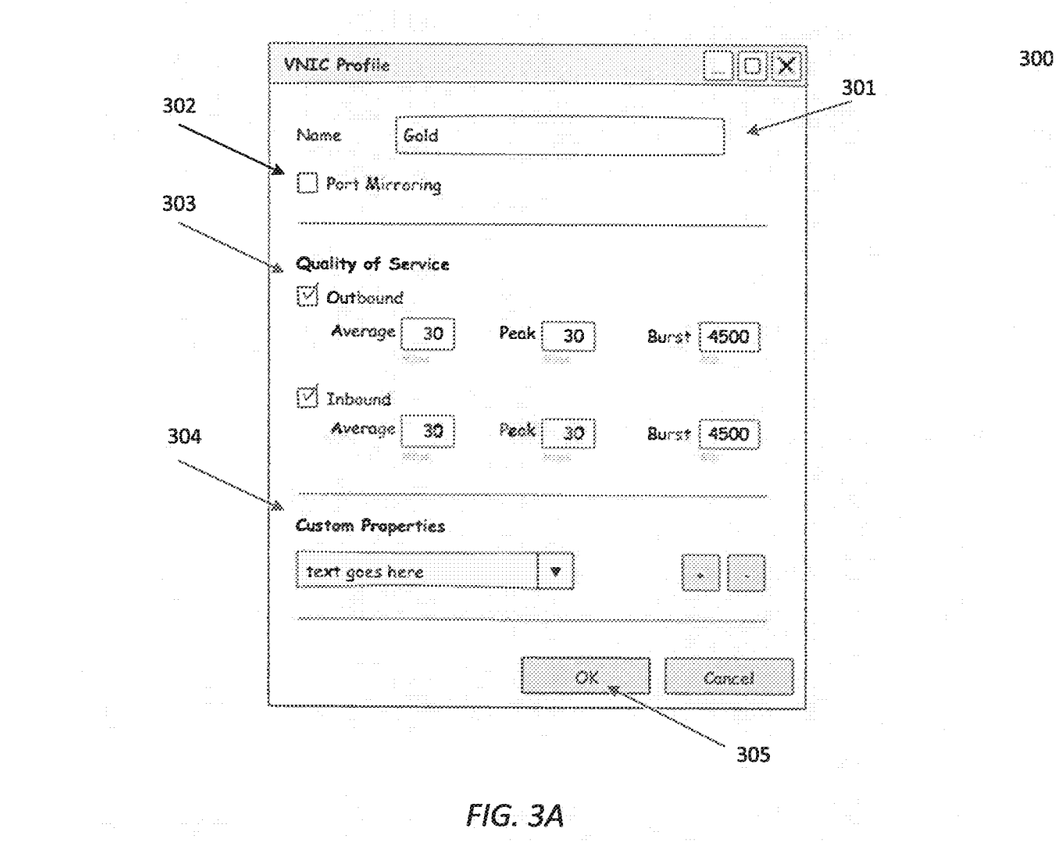
FIG. 3A illustrates an example network manager GUI to add a profile to a logical network according to an implementation of the disclosure.

FIG. 3A illustrates a display of network manager GUI 300 to add a profile to a logical network according to an implementation of the disclosure. A profile tab may be added to a main network management page (not shown) of a network. An activation of the profile tab may cause the display of a dialog box 300 from which a profile may be created added to a logical network. Referring to FIG. 3A, the dialog box 300 may include a first section 301 to enter a profile name (such as "Gold"). The first section 301 may be a text box, and the profile entered name may identify the profile. Dialog box 300 may further include a second section 302 to enable or disable port mirroring. In one implementation, the second section 302 may be a check box that, when checked, indicates that the port mirroring is enabled. Port mirroring allows the traffic to the logical network to be copied at a network monitor node. Dialog box 300 may also include a third section 303 to set up quality of service (QoS) values which may include outbound average, peak, and burst bit rates, and inbound average, peak, and burst bit rates. The bit rates may be measured in megabits per second (Mbps). Dialog box 300 may also include a forth section 304 to set up customer properties. Custom properties may specify special values may be passed from a VNIC to a hook for devices that is to be plugged into and unplugged from the host. Section 304 may include a drop down list through which a customer property may be added to the profile. Once attributes of a profile in Sections 301-304 are entered, a profile may be created for the logical network and saved in the configuration database 216 by activating the OK 305 button.

In one implementation, the dialog box 300 may also include a section (not shown) to set up the access privilege of the created profile. For example, the profile may be made public so that a user (who is not the network administrator) of the VMs may edit the profile. Alternatively, the profile may be made private so that only a network administrator with access privilege to the profile may edit the profile.

Figure 3B:
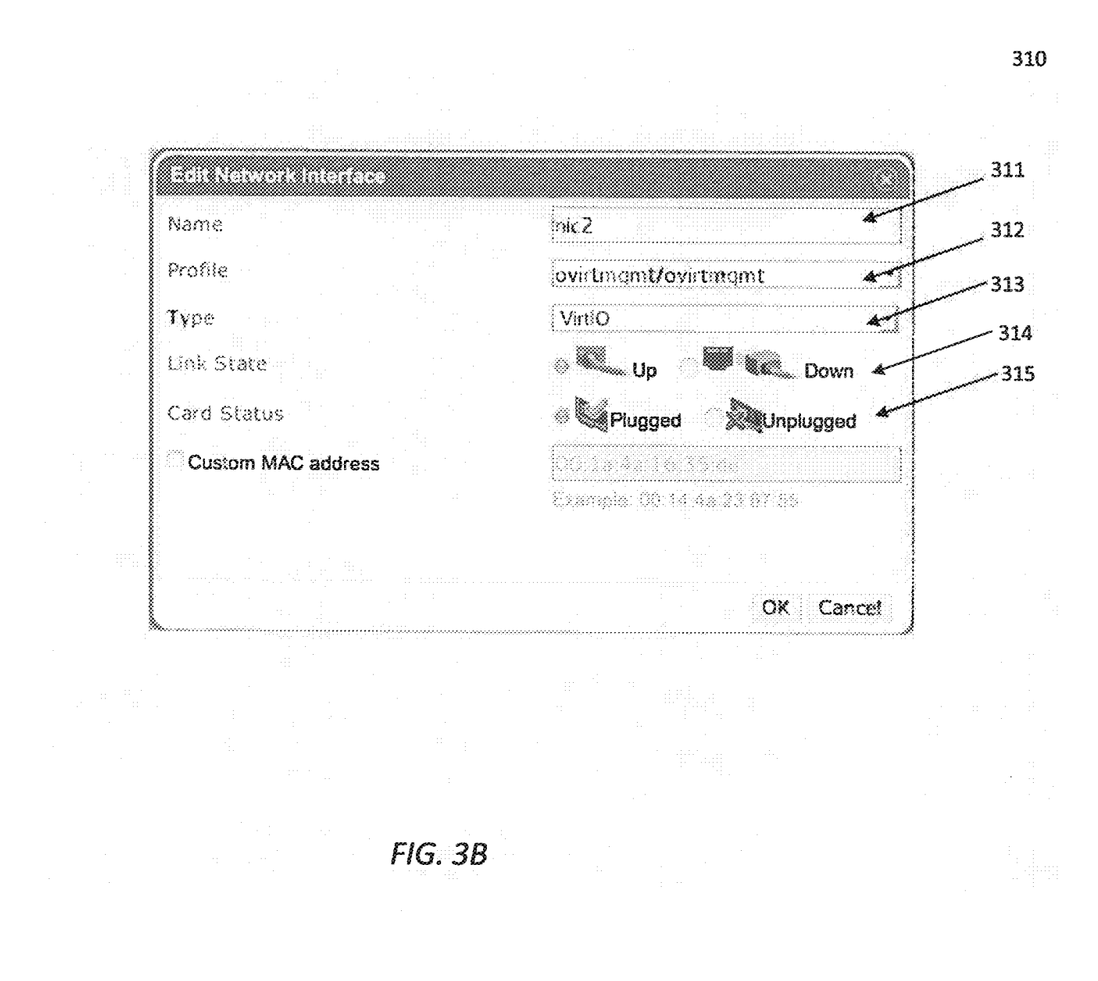
FIG. 3B illustrates an example profile selection GUI according to an implementation of the disclosure.

A profile may be selected out of a number of profiles using a profile selection GUI. FIG. 3B illustrates an example profile selection GUI 310 according to an implementation of the disclosure. The GUI 310 may include a first field 311 to present an identification of a VNIC (such as nic2) to which a profile is about to be selected and assigned. A second field 312 may include a drop down list which may present a list of networks that are associated with the VNIC. For example, when drop down list is activated, a list of network profiles (such as profile Gold created as shown in FIG. 3A) may be displayed for the user to select one of the profiles that may be used to configure the VNIC. Section 313 may include another drop down list that may present a list of virtual operating system (OS) types. For example, the OS may run as a full virtualization ("VirtIO"), as shown in FIG. 3B, in which the hypervisor may emulate all hardware network cards. Advanced values and customer properties may also be selected. For example, on section 314, the state of the network connection link between the VNIC to the network may be selected. The UP state may indicate that the VNIC is defined on the corresponding VM and connected to the network. On the other hand, the DOWN state may indicate that the VNIC is defined on the corresponding VM and is currently not connected to any network. On section 315, the virtual network interface card may be selectively plugged or unplugged.

In one implementation, each user may be assigned with a role with authorizations to view a set of networks and VNIC profiles. The authorization may be determined by the management server at the log-in of the user. When the user logs into management server 203, the user may be identified, and according to his log-in credentials, the management server may present the GUI 310 which include profiles that the user is authorized to select. The user may select a profile out of the authorized profiles using the following method.

Figure 4:
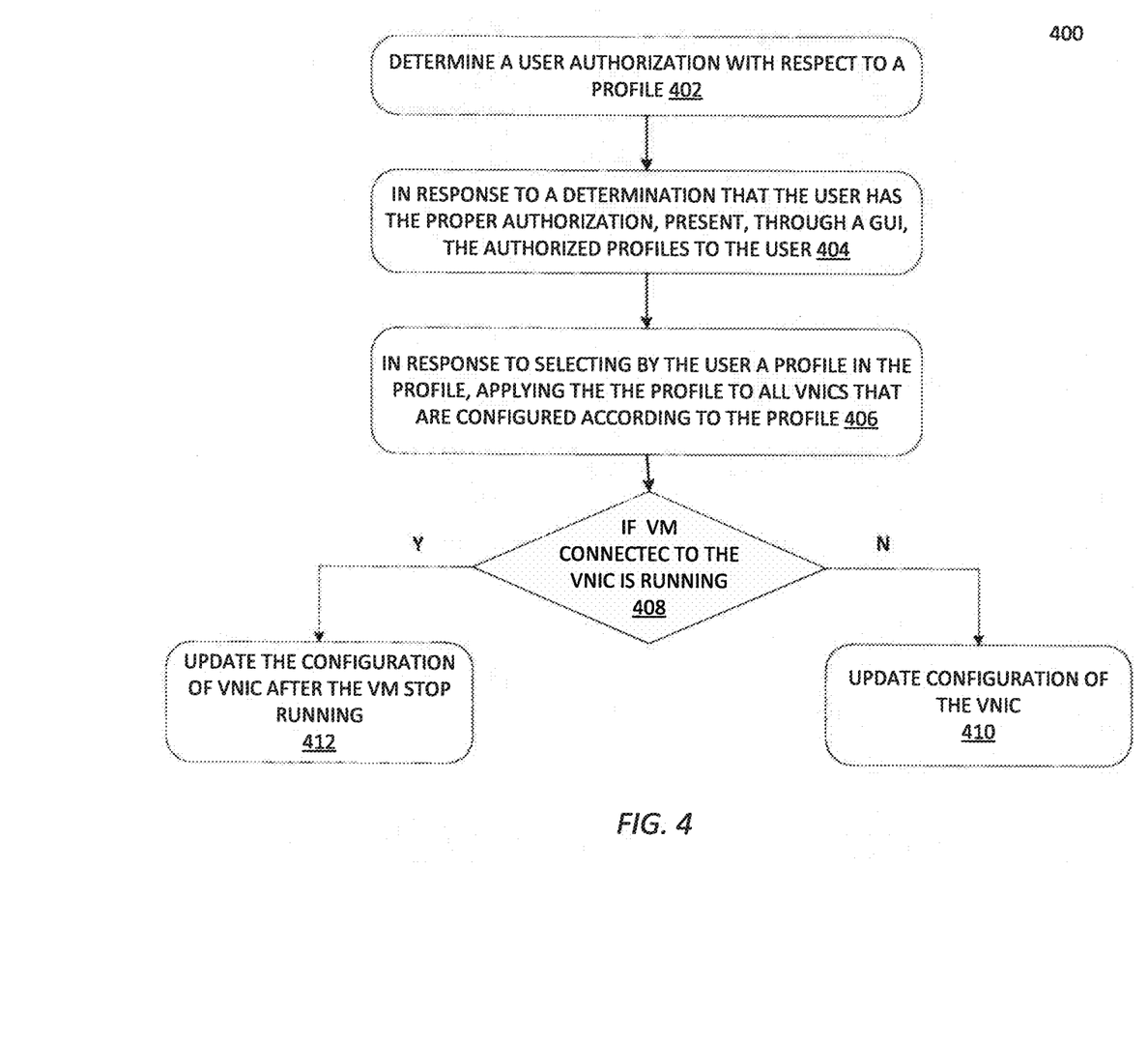
FIG. 4 shows a flow diagram illustrating an example of a method to edit a profile according to an implementation of the disclosure.

FIG. 4 shows a flow diagram illustrating an example of a method 400 to select a profile according to implementations of the present disclosure. Method 400 may be performed by a processing logic that may include hardware (e.g., circuitry, dedicated logic, programmable logic, microcode, etc.), software (e.g., instructions run on a processing device to perform hardware simulation), or a combination thereof. In one example, method 400 may be performed by management server 203 as shown in FIG. 2.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 4, at 402, the management server may determine the authorization of a user with respect to which profiles he may access. The privileges as to who can access profiles may have been assigned at the time when the profile was created. At 404, in response to a determination that the user has the proper authorizations to access a number of profiles, the management server may present, through a GUI, the profiles for selection. At 406, in response to selecting a profile through the GUI, the management server may apply values in the selected profile to map the VNIC to logical networks. Prior to changing the configuration of a VNIC, at 408, the management server may determine if the VM connected to the VNIC is running. If the VM is not running, at 410, the management server may update the configuration of the VNIC using values in the selected profile. If the VM is running, at 412, the management server may wait after the VM connected to the VNIC stop running to update the configuration of the VNIC using values in the selected profile. For example, the updated profile may apply at next run of the VM.

Similarly, a profile may be deleted. However, the deletion occurs after all VMs using the profile have finished using the profile.

Figure 5:
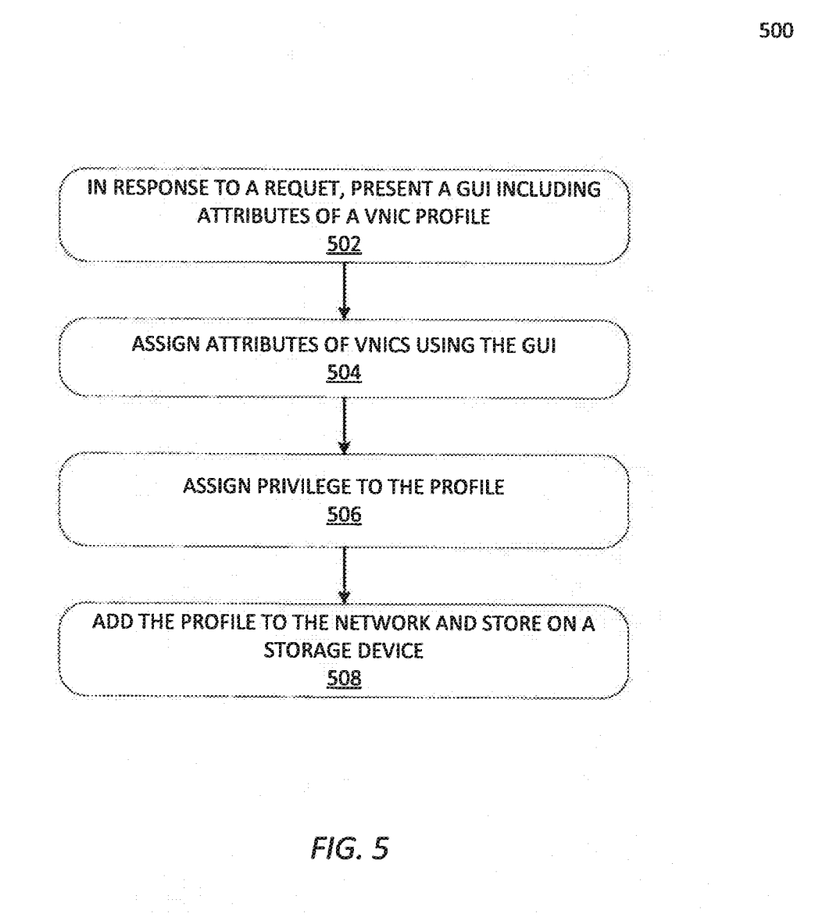
FIG. 5 shows a flow diagram illustrating an example of a method to create a profile according to an implementation of the disclosure.

In one implementation, a profile may be created for a logical network. FIG. 5 shows a flow diagram illustrating an example of a method 500 to create a profile according to implementations of the present disclosure. Method 500 may be performed by a processing logic that may include hardware (e.g., circuitry, dedicated logic, programmable logic, microcode, etc.), software (e.g., instructions run on a processing device to perform hardware simulation), or a combination thereof. In one example, method 500 may be performed by management server 203 as shown in FIG. 2.

Referring to FIG. 5, at 502, in response to a request to add a profile to a logical network (such as activating a tab on network management page of the logical network), the management server may present a GUI (such as 300), the GUI including configurable network attributes of a VNIC profile. The attributes may include the profile name, QoS, port mirroring, and custom properties. The GUI may include actionable elements through which values for these attributes may be selected or set. At 504, values to these attributes may be set. These values may be used to specify network configurations of VNICs. At 506, a privilege of the profile may be set. For example, the privilege may include "public" privilege that allows the profile the profile to be shared with users, or a "private" privilege to make it exclusive to the network administrator. At 508, the created profile may be saved on a storage of the network server. The profile may be used to configure the network of one or more VNICs of VMs.

In one implementation, a default profile may be created by the management server each time a network is added to the VM. In another implementation, the creation of a default profile may be optionally declined. When a network is removed from a VM (e.g., at a network administrator's direction using a network management GUI), all profiles associated with the network may be removed. In one implementation, a non-virtual machine network may be modified to be a VM network (e.g., at a network administrator's direction using a network management GUI). In this scenario, a default profile may be created in response to the conversion. Conversely, when a virtual machine network is converted into a non-VM network (e.g., at a network administrator's direction using a network management GUI), all VNICs profiles associated with the network may be deleted.

In one implementation, a new (and empty) data center (like data center 200) may be created. The new data center may include automatically created management server and a default VNIC profile created for the management server. Conversely, when a data center is removed, all data center's networks and associated profiles are also removed.

Figure 6:
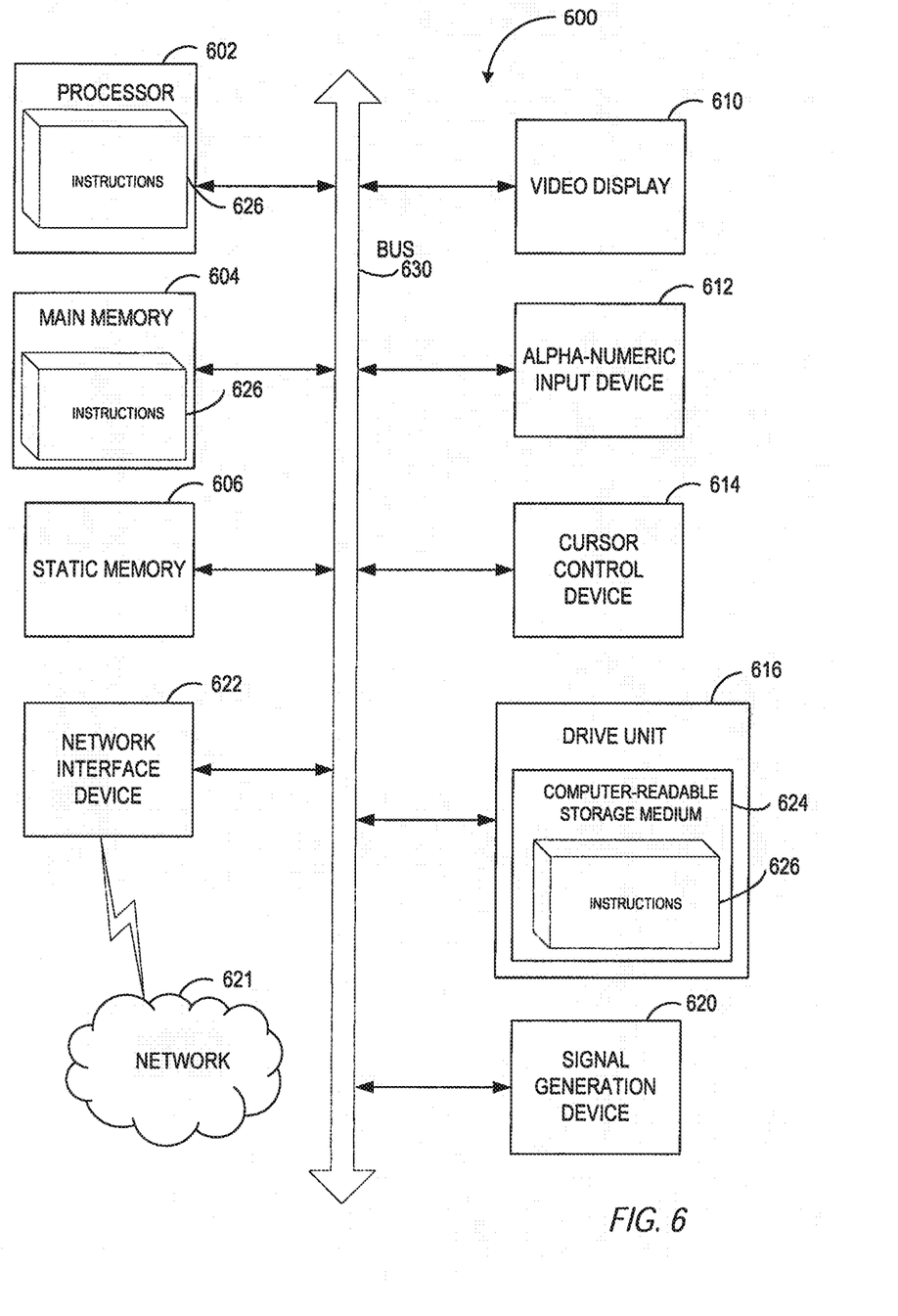
FIG. 6 shows a diagrammatic representation of a machine in the form of a computer system, in accordance with one example.

FIG. 6 depicts a diagrammatic representation of a machine in the form of a computer system 600 within which a set of memory instructions 626, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602 (e.g., a processing device), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the operations for the core dump-level stack trace subsystem 120 for performing steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the core dump-level stack trace subsystem 120) for the computer system 100 representing any one or more of the methodologies or functions described herein. The instructions 626 for the computer system 100 may also reside, completely or at least partially, within the main memory 604 and/or within the processor 602 during execution thereof by the computer system 600, the main memory 604 and the processing device 602 also constituting computer-readable storage media. The instructions 626 for the computer system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
presenting on a graphic user interface (GUI), by a management server of a host executing a virtual machine (VM), a plurality of attributes of a virtual network interface card (VNIC);
assigning, via the GUI, a respective one of a plurality of values to each one of the plurality of attributes;
storing the plurality of values in a profile on the management server; and
configuring, by a processing device associated with the management server, a second VNIC using the plurality of values in the profile.

2. The method of claim 1, further comprising:
configuring a plurality of VNICs associated with one or more virtual machines using the plurality of values in the profile.

3. The method of claim 1, further comprising:
assigning a privilege level to the profile, wherein the privilege level is one of public or private, and wherein the public privilege level grants a user of the VM a right to modify at least one of the plurality of values in the profile, and the private privilege withdraws the right from the user.

4. The method of claim 1, wherein the configuring comprises:
presenting, on the GUI, to a user with one or more profiles which the user is authorized to access;
in response to selecting a profile out of the one or more profiles, configuring the second VNIC of the VM using the plurality of values in the selected profile.

5. The method of claim 1, further comprising;
in response to determining that the VM is not running, configuring the VNIC using the plurality of values of the selected profile; and
in response to determining that the VM is running, configuring the VNIC using the plurality of values of the selected profile after the VM stops running.

6. The method of claim 1, wherein the plurality of attributes include an identification of a logical network to which the VNIC is coupled.

7. The method of claim 1, wherein the plurality of attributes include at least one of a quality of service attribute or a custom property.

8. An apparatus comprising:
a memory; and
a processing device, communicatively coupled to the memory, to:
present on a graphic user interface (GUI), by a management server associated with the processing device executing a virtual machine (VM), a plurality of attributes of a virtual network interface card (VNIC);
assign, via the GUI, a respective one of a plurality of values to each one of the plurality of attributes;
store the plurality of values in a profile of the management server; and
configure a second VNIC using the plurality of values in the profile.

9. The apparatus of claim 8, wherein the processing device is further to:
configure a plurality of VNICs associated with one or more virtual machines using the plurality of values in the profile.

10. The apparatus of claim 8, wherein the processing device is further to:
assign a privilege level to the profile, wherein the privilege level is one of public or private, and wherein the public privilege level grants a user of the VM a right to modify at least one of the plurality of values in the profile, and the private privilege withdraws the right from the user.

11. The apparatus of claim 8, wherein to configure further comprises to:
present, on the GUI, to a user with one or more profiles which the user is authorized to access;
in response to selecting a profile out of the one or more profiles, configure the second VNIC of the VM using the plurality of values in the selected profile.

12. The apparatus of claim 8, wherein the processing device is further to:
in response to determining that the VM is not running, configure the VNIC using the plurality of values of the selected profile; and
in response to determining that the VM is running, configure the VNIC using the plurality of values of the selected profile after the VM stops running.

13. The apparatus of claim 8, wherein the plurality of attributes include an identification of a logical network to which the VNIC is coupled.

14. The apparatus of claim 8, wherein the plurality of attributes include at least one of a quality of service attribute or a custom property.

15. A non-transitory computer readable storage medium including instructions that, when executed by a processing device, cause the processing device to:
present on a graphic user interface (GUI), by a management server associated with the processing device executing a virtual machine (VM), a plurality of attributes of a virtual network interface card (VNIC);
assign, via the GUI, a respective one of a plurality of values to each one of the plurality of attributes;
store the plurality of values in a profile on the management server; and
configure, by the processing device associated with the management server, a second VNIC using the plurality of values in the profile.

16. The non-transitory computer readable storage medium of claim 15, wherein the processing device is further to:
configure a plurality of VNICs associated with one or more virtual machines using the plurality of values in the profile.

17. The non-transitory computer readable storage medium of claim 15, wherein the processing device is further to:
assign a privilege level to the profile, wherein the privilege level is one of public or private, and wherein the public privilege level grants a user of the VM a right to modify at least one of the plurality of values in the profile, and the private privilege withdraws the right from the user.

18. The non-transitory computer readable storage medium of claim 15, wherein the processing device is further to:
present, on a GUI, to a user with one or more profiles which the user is authorized to access;
in response to selecting a profile out of the one or more profiles, configure the second VNIC of the VM using the plurality of values in the selected profile.

19. The non-transitory computer readable storage medium of claim 15, wherein the plurality of attributes include an identification of a logical network to which the VNIC is coupled.

20. The non-transitory computer readable storage medium of claim 15, wherein the plurality of attributes include at least one of a quality of service attribute or a custom property.

* * * * *